Patented Jan. 3, 1928.

1,655,396

UNITED STATES PATENT OFFICE.

DUANE E. WEBSTER, OF WORCESTER, MASSACHUSETTS, ASSIGNOR TO NORTON COMPANY, OF WORCESTER, MASSACHUSETTS, A CORPORATION OF MASSACHUSETTS.

ABRASIVE ARTICLE AND METHOD OF MAKING THE SAME.

No Drawing.   Application filed April 14, 1926.   Serial No. 102,057.

This invention relates to abrasive articles and more particularly to abrasive articles, such as a grinding wheel, in which the abrasive grains are bonded by a vulcanizable compound, such as rubber.

Abrasive articles, such as grinding wheels, are commonly made by uniting grains of abrasive, such as crushed crystalline alumina or silicon carbide, with a suitable bonding material. The particular bonding material employed depends to a large extent upon the type of grinding operation in which the grinding wheel is to be employed. Thus, the abrasive grains may be bonded by such materials as a vitrified ceramic material, shellac, synthetic resins or by vulcanized rubber. Each of these types of abrasive wheels has its own particular field of utility and each is better adapted to use in that particular field than any of the other types.

Abrasive wheels produced by uniting abrasive grains with a bond of vulcanized rubber have been found particularly useful in grinding operations which require extremely high peripheral velocities. In the course of such a grinding operation, considerable heat is developed which tends to soften the rubber and weaken the bond so that the abrasive grains are readily separated.

It is the object of the present invention to provide an abrasive article, such as a grinding wheel, composed of abrasive grains united by a bond containing a vulcanizable compound, such as rubber, which is more resistant to heat changes and is capable of more extensive use and longer life under operating conditions developing a considerable amount of heat than such wheels constructed in accordance with the heretofore commonly accepted practices.

As a result of extended investigations, it has been discovered that the addition of certain agents to the vulcanizable compound, or rubber bond, may modify the properties of the bond so as to render it more resistant to heat changes while not detrimentally affecting its other advantageous properties. A suitable agent for this purpose may comprise a synthetic resin, such as a condensation product of phenol and formaldehyde. The abrasive grains, sulphur and the synthetic resin, are intimately incorporated in the crude or raw rubber, preferably by mechanically mixing therewith, and the mixture is shaped into the form of a grinding wheel, or other abrasive article, and vulcanized under heat and pressure in accordance with any accepted practice.

In general, an abrasive article constructed in accordance with the invention will have the abrasive grains united by a bond containing a predominating amount of a vulcanizable compound, such as rubber, and will contain also an agent adapted to modify the properties of the bond so as to increase its resistance to detrimental changes ordinarily caused by the heat developed during the grinding operation. The amount and type of such agent employed should be governed by the particular type of grinding operation to be performed, a greater amount being used where the grinding operation is apt to develop an excessive amount of heat than where a minimum amount of heat is developed. Ordinarily, in the practice of the invention, I employ that synthetic resin known on the market under the trade name of "Bakelite" which is a condensation product of phenol and formaldehyde and find that it may be used to advantage in amounts up to about 30% by weight.

As an example of a grinding wheel made in accordance with this invention, I may utilize the "Bakelite" brand of synthetic resin combined with rubber, sulfur and abrasive in the following proportions:

|  | Parts by weight. |
|---|---|
| Rubber | 9.75 |
| Sulphur | 5.25 |
| Synthetic resin | 1.00 |
| Abrasive grains (of desired size) | 112.00 |

The crude or raw rubber may be repeatedly passed between mixing rolls, and small increments of the required amount of sulphur, abrasive grains and synthetic resin, in the form of a powder or flour, may be added at desired intervals, whereby an intimate mixture of the abrasive grains, sulphur and synthetic resin is produced. The mixture is then rolled out into sheets of a desired thickness depending upon the thickness of the grinding wheel, or other abrasive article, being made and is cut to the size and form desired. The article thus formed is placed in a vulcanizing mould and vulcanized under heat and pressure in accordance with any accepted practice.

A grinding wheel of the above composition is found to have an increased useful life for various types of grinding operation as compared with the life of a grinding wheel of the same grain size and grade bonded by vulcanized rubber alone. This increased life is accounted for by the fact that the bond uniting the abrasive grains is not affected by the heat developed during the grinding operation as readily as a bond of the types heretofore commonly employed and composed essentially of vulcanized rubber. Thus, in a wheel containing the bond mixture of the invention the abrasive grains do not readily separate, because its bond does not soften as quickly as a bond composed entirely of vulcanized rubber.

Having thus described my invention, what I claim as new and desire to secure by Letters Patent is:

1. The method of making an abrasive article which comprises intimately incorporating in a mixture of abrasive grains, a vulcanizable compound and sulphur, an agent capable of modifying the properties of said compound to render it more resistant to heat changes, and thereafter shaping and vulcanizing the article.

2. The method of making an abrasive article which comprises incorporating in a mixture of abrasive grains, sulphur and rubber, a synthetic resin in amount sufficient to modify the properties of the rubber and render it more resistant to heat changes, and thereafter shaping and vulcanizing the article.

3. The method of making an abrasive article which comprises incorporating in a mixture of abrasive grains, rubber and sulphur, not more than about 30% of a synthetic resin in the form of a condensation product of phenol and formaldehyde, and thereafter shaping and vulcanizing the article.

4. An abrasive article comprising abrasive grains bonded by vulcanized rubber containing an ingredient intimately incorporated in the rubber and capable of modifying the properties of the rubber to render it more resistant to heat changes so as to hold the abrasive grains more firmly under operating conditions developing considerable heat.

5. An abrasive article comprising abrasive grains united by a bond composed in large part of vulcanized rubber and containing a synthetic resin in the form of a condensation product of phenol and formaldehyde in amount sufficient to modify the properties of the rubber to render it more resistant to heat changes whereby the abrasive grains are held more firmly under operating conditions developing considerable heat.

6. An abrasive article comprising abrasive grains bonded by vulcanized rubber containing not more than about 30% of a synthetic resin in the form of a condensation product of phenol and formaldehyde intimately incorporated therewith.

Signed at Worcester, Massachusetts, this 13th day of April 1926.

DUANE E. WEBSTER.